June 18, 1929.  J. L. LARRAD  1,717,789
LOCK NUT
Filed Feb. 15, 1927
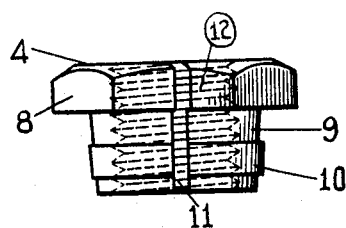
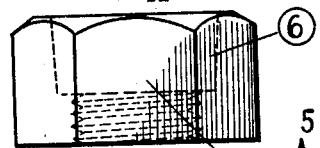
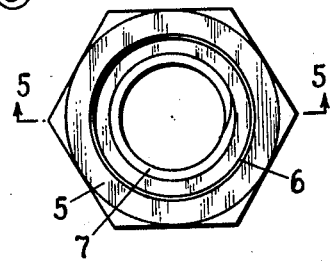
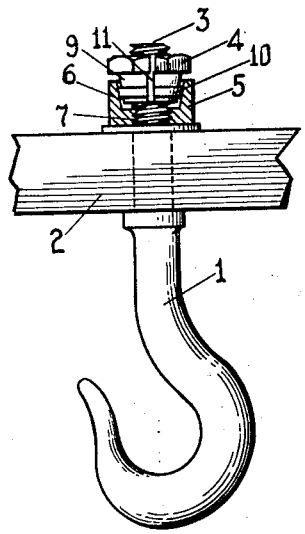
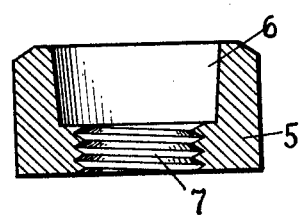
INVENTOR
John Lewis Larrad
BY
Dodson & Roe
ATTORNEYS Patented June 18, 1929.

1,717,789

UNITED STATES PATENT OFFICE.

JOHN LEWIS LARRAD, OF TOTNES, ENGLAND, ASSIGNOR TO THOMAS H. BROWN, OF NEW YORK, N. Y.

LOCK NUT.

Application filed February 15, 1927. Serial No. 168,259.

My invention relates to that class of nuts designed to lock upon a bolt so as not to release even if the tension upon the bolt is released. Under such circumstances, it can be used where a swiveling action of the bolt is desirable. It is also designed as an improvement upon the lock nut described in my United States Letters Patent No. 1,025,702, granted May 7, 1912.

My means of accomplishing the foregoing objects may be more readily understood by reference to the accompanying drawings, which are hereunto attached and are a part of this specification, in which:

Fig. 1 is an assembled view of the nut employed upon a hook which has a swiveling motion, part of the device being shown in section, to disclose the interior construction;

Fig. 2 is a side elevation of the lock nut proper;

Fig. 3 is a side elevation of the cooperating member;

Fig. 4 is a top or plan view of the same;

Fig. 5 is a cross-section, taken on the line 5—5 in Fig. 4.

Similar reference numerals refer to similar parts throughout the entire description.

As shown in the drawings, a hook 1 is swiveled in a beam 2, only a fragmentary portion of this being shown, as, obviously, it forms no part of my invention. The shank of the hook 1 is provided with threads 3. Upon these threads 3 is mounted the hexagonally shaped member 5 which cooperates with the lock nut 4. This member 5 is provided with an inwardly extending tapering recess 6, circular in shape, which extends for a part of the width of the nut 4, the remainder of said member 5 being provided with internal threads 7 which are fitted to, and coincide with, the threads 3 cut upon the shank of the hook 1.

The lock nut 4 is provided with a hexagonal portion 8, and a downwardly depending circular neck or stem 9. This neck or stem 9 is provided with a rib 10, the outer wall of which is flat and tapered to coincide with the taper of the recess 6 in the member 5. This nut 4 is also provided with a concentric internally threaded aperture (12), and is further provided with a slot 11 which extends through the entire width of said nut 4.

I have found, in use, where the slot 11 extends only through the neck or stem 9, as shown in my patent hereinbefore referred to, that in time the stem 9 fractures at its point of union with the hexagonal portion and breaks off; whereas, if the slot 11 extends throughout both the hexagonal portion and the stem, this tendency to fracture is entirely obviated.

I have also found that when the rib 10 is convex, as shown in my said patent, it has a tendency at the slots to cut the tapered surface of the recess 6, thus locking the two cooperating members together so that it is very difficult to remove them separately from a bolt, and such removal operates to utterly destroy the threads on the bolt. By my construction as shown in the accompanying drawings, these difficulties are entirely eliminated, because I provide a flat tapered surface on the rib 10, which is fitted to, and coincides with, the flat tapered surface of the recess 6, so as to obviate the slightest tendency for any cutting as the two surfaces are brought together in frictional engagement.

I have also found that it is very desirable to construct this nut 4 with its internally threaded aperture from one-sixty-fourth to one-thirty-second part of an inch smaller than the bolt upon which it is to be used. This causes it to be a spring nut, and as a consequence it will cling to the bolt even if the cooperating member 5 moves away from it. This is highly important in locations where it is essential that the bolts be not disengaged from the nuts.

Having thus described my invention, what I regard as new, and desire to secure by Letters Patent of the United States, is:

1. A lock nut, consisting of a member having a central threaded opening, and a central inwardly extending recess, the walls of which are tapered; a second member having a concentric threaded aperture therethrough said second member being formed with a hexagonal portion and a downwardly depending neck or stem; an intermediate rib on said stem, the outer wall of which is a conical surface having a taper to fit the tapered wall of the recess in said first member; said second member being slotted throughout its entire width.

2. A lock nut, consisting of a member having a central threaded opening, and a central inwardly extending recess, the walls of which are tapered; a second member having a concentric threaded aperture therethrough, said second member being formed with a hexagonal portion and a downwardly depending neck or stem; an intermediate rib on said stem, the outer wall of which is a conical surface having a taper to fit the tapered wall of the recess in said first member; said second member being slotted throughout its entire width, said slot being secant to said threaded aperture.

3. The combination, with a threaded bolt, of a threaded member mounted thereon, there being a recess in said member, the walls of which are tapered; a second member, having a central threaded aperture, mounted on said bolt, said second member comprising a hexagonal portion and a reduced neck or stem; an intermediate rib on said stem, the surface of which is a conical surface having a taper to fit the tapered recess in the first named member, there being a slot extending throughout said hexagonal portion and said stem on said second member.

JOHN LEWIS LARRAD.